United States Patent [19]

Delino, Jr.

[11] Patent Number: 4,781,147

[45] Date of Patent: Nov. 1, 1988

[54] PORTABLE SAFETY SEAT AND CARRIER FOR SMALL ANIMAL

[76] Inventor: Joseph V. Delino, Jr., 1481 NW. 7th St., Apt. 5, Miami, Fla. 33125

[21] Appl. No.: 85,337

[22] Filed: Aug. 14, 1987

[51] Int. Cl.⁴ .............................................. A01K 1/03
[52] U.S. Cl. ........................................ 119/17; 119/19
[58] Field of Search .............................. 119/17, 19, 96; 224/42.03 A, 325

[56] References Cited

U.S. PATENT DOCUMENTS

| 920,975 | 5/1909 | Minion | 119/19 |
|---|---|---|---|
| 1,979,877 | 11/1934 | Hane | 119/19 |
| 2,530,148 | 11/1950 | Bjorklund et al. | 119/17 |
| 3,195,505 | 7/1965 | Hauth et al. | 119/17 |
| 3,359,946 | 12/1967 | Schluttig | 119/19 X |
| 3,765,375 | 10/1973 | Yung | 119/96 |
| 4,010,880 | 3/1977 | Guillot-Munoz | 224/42.42 A |

FOREIGN PATENT DOCUMENTS 377893  8/1932  United Kingdom .................. 119/19

Primary Examiner—Robert P. Swiatek
Attorney, Agent, or Firm—Oltman and Flynn

[57] ABSTRACT

A portable carrier for a small animal, such as a cat, having an inverted wire basket hinged at one end to a flat base. The base is covered with a terry cloth envelope held in place snugly on the base by "Velcro" fasteners. At the opposite end from its hinged attachment to the base, the inverted wire basket has a hook-shaped wire for manually releasable attachment to the corresponding end of the base. At this opposite end the inverted wire basket has a top opening large enough to pass the animal's head and neck but not the animal's body below the neck. The edges of this opening are covered with a protective strip.

8 Claims, 2 Drawing Sheets

PORTABLE SAFETY SEAT AND CARRIER FOR SMALL ANIMAL

SUMMARY OF THE INVENTION

This invention relates to a portable carrier for a small animal, particularly a cat.

A principal object of this invention is to provide a novel, easily portable carrier for a small animal, such as a cat, in which the animal will be comfortable and not unduly apprehensive because he or she can see out in all directions. The carrier has a top opeing dimensioned to pass the animal's head and neck but not the animal's body below the neck so that, with his or her head sticking out, the animal can feel more relaxed and free of the feeling of being completely confined or trapped.

The present carrier is especially adapted to be mounted on the back of a bicycle or to be safely held on the seat of a car by a conventional seat belt.

Preferably, the small animal carrier of the present invention comprises an inverted wire basket over a rigid flat base covered with terry cloth or other suitable soft absorbent material. At one end the basket is hinged to the base and at the opposite end it has a hook-shaped wire for manually releasable attachment to the base. The opening for the animal's head is located in the top of the inverted basket at this opposite end, which makes it easy to secure the basket to the base, enclosing the animal's body, while the animal is in a standing position. The inverted wire basket may be a slightly modified bicycle basket of standard size and conventional design.

Further objects and advantages of this invention will be apparent from the following detailed description of a presently-preferred embodiment thereof, shown in the accompanying drawings.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

Figure 1:
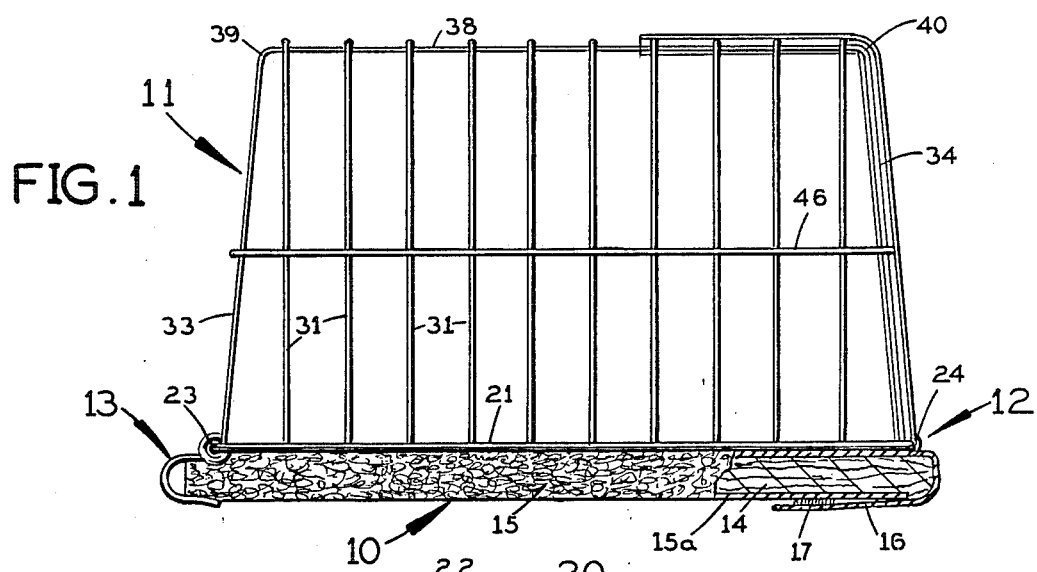
FIG. 1 is a side elevation of the animal carrier, with one end of the base in section.
Figure 2:
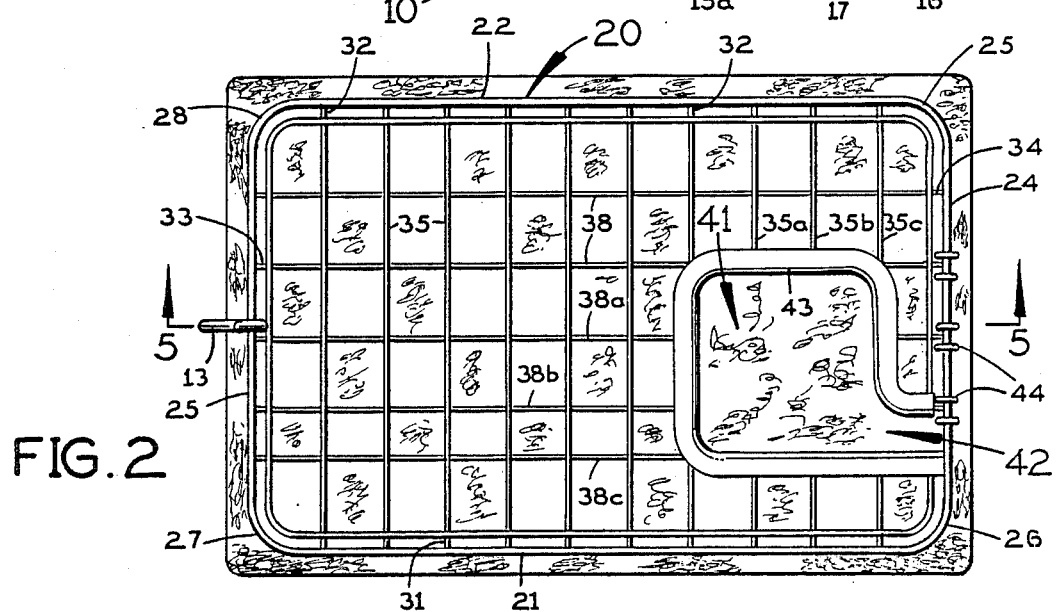
FIG. 2 is a top plan view.

Referring to FIG. 1, in broad outline the small animal carrier of the present invention comprises a substantially rigid, flat, rectangular base 10, an inverted wire basket 11 hinged at 12 to the base at the right end of both in FIGS. 1 and 2, and a manually releasable hook-shaped wire 13 hinged to the opposite end of the inverted wire basket 10 and engaging the adjacent end of the base to attach them together at that end.

The base 10 comprises a rectangular board 14 of plywood, fibreboard or the like with a soft absorbent cover 15 of terry cloth towel material. The cover 15 has a snug, sliding fit on the base board 14 and at the right end in FIG. 1 it has an end flap 16 that extends beneath the bottom 15a of the cover and is manually releasably attached to it by "Velcro" fasteners 17. Alternatively, the attachment could be made by snap fasteners, a slide fastener or magnetic fastener elements. The cover 15 is slidably removable from the base board 14 so that it can be washed and then placed back on the base board.

The inverted basket 11 preferably is a slightly modified Schwinn bicycle basket made up of substantially rigid metal wires. In its inverted position the basket presents a rigid, peripheral, bottom rail of generally rectangular outline, designated as a whole by the reference numer 20 in FIG. 2. It presents elongated, striaght, opposite side segments 21 and 22, elongated but shorter, straight, opposite end segments 23 and 24, and rounded corner segments 25,26,27 and 28 connecting the side and end segments.

Figure 3:
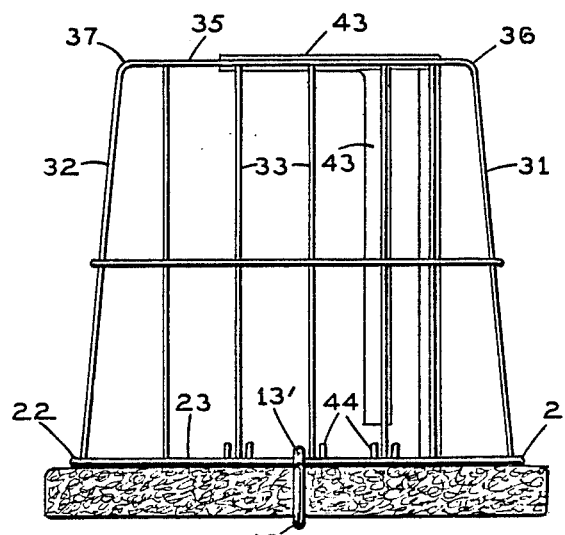
FIG. 3 is an end elevation taken from the left end of FIGS. 1 and 2.

As shown in FIGS. 1 and 3, a plurality of parallel, straight, elongated, upstanding wire members 31 extend up from side segment 21 of bottom rail 20 at a slight angle inward toward the opposite side of the basket. Similar upstanding wire members 32 (FIG. 3) extend up from side segment 22 of the bottom rail at a slight angle inward toward the side of the basket where the upstanding wire members 31 are located. At the left end in FIG. 1, similar upstanding wire members 33 extend up from end segment 23 of bottom rail 20 at a slight angle inward toward the opposite end of the basket. At the right end, similar wire members 34 extend up from end segment 24 of the bottom rail at a slight angle inward toward the end of the basket where the wire members 33 are located. These upstanding wire members 31,32,33 and 34 are close enough together to prevent the escape of the small animal confined in the carrier, such as a cat.

At the top of the inverted basket, as shown in FIGS. 2 and 3, a a plurality of parallel, straight, elongated, horizontal, wire, cross segments 35 extend between the upper ends of the upstanding side members 31 and 32 and are joined to them by rounded corner segments 36 and 37 (FIG. 3). Also at the top of the inverted basket, similar horizontal, wire, longitudinal segments 38 extend between the upper ends of the upstanding end members 33 and 34 and are joined to them by rounded corner segments 39 and 40 (FIG. 1). The horizontal segments 35 and 38 cross each other at right angles and they are welded to one another where they cross, providing a rectangular grid across the top of the inverted basket.

Figure 4:
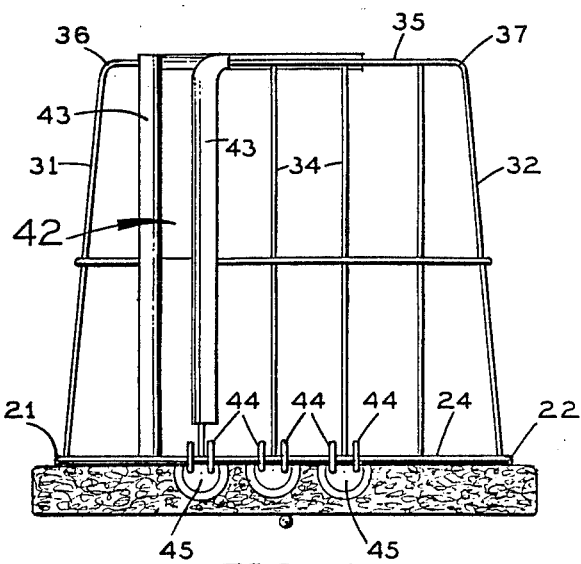
FIG. 4 is an end elevation taken from the right end of FIGS. 1 and 2.

Adjacent the right end in FIGS. 1 and 2 this rectangular grid on top of the inverted basket is interrupted by a generally rectangular opening 41 (FIG. 2) which is large enough to pass the animal's head and neck but not the animal's body below the neck. In the particular embodiment shown, this opening 41 is provided by removing part of the two cross segments 35a and 35b and two longitudinal segments 38a and 38b where they cross. In addition, the endmost cross segment 35c at this end of the inverted basket is removed between longitudinal segment 38b and the final longitudinal segment 38c along this side of the inverted basket at the top. This leaves a gap 42 in the top of the inverted basket which extends down along this end of the basket to segment 24 of bottom rail 20, as shown in FIG. 4.

To protect the animal a strip 43 of flexible, leather-like plastic of channel-shaped cross-section is attached to the wire members along the edges of the top opening 41 and the end gap 42.

Three pairs of metal hooks 44 extend up from the base board 14 through openings 45 (FIG. 4) in the terry cloth cover 15. These hooks present arcuate, generally C-shaped upper ends through which the end segment 24 of the bottom rail 20 extends loosely. End segment 24 can turn inside these hooks so that the basket can be pivoted between the inverted position, shown in full lines in FIG. 5, and a raised position, shown in phantom. The hooks 44 of each pair are located on opposite sides of corresponding wire members 34 on that end of the basket and are positioned close enough to the respective members 34 to prevent the inverted basket from shifting back and forth on the base more than a small fraction of an inch.

Figure 5:
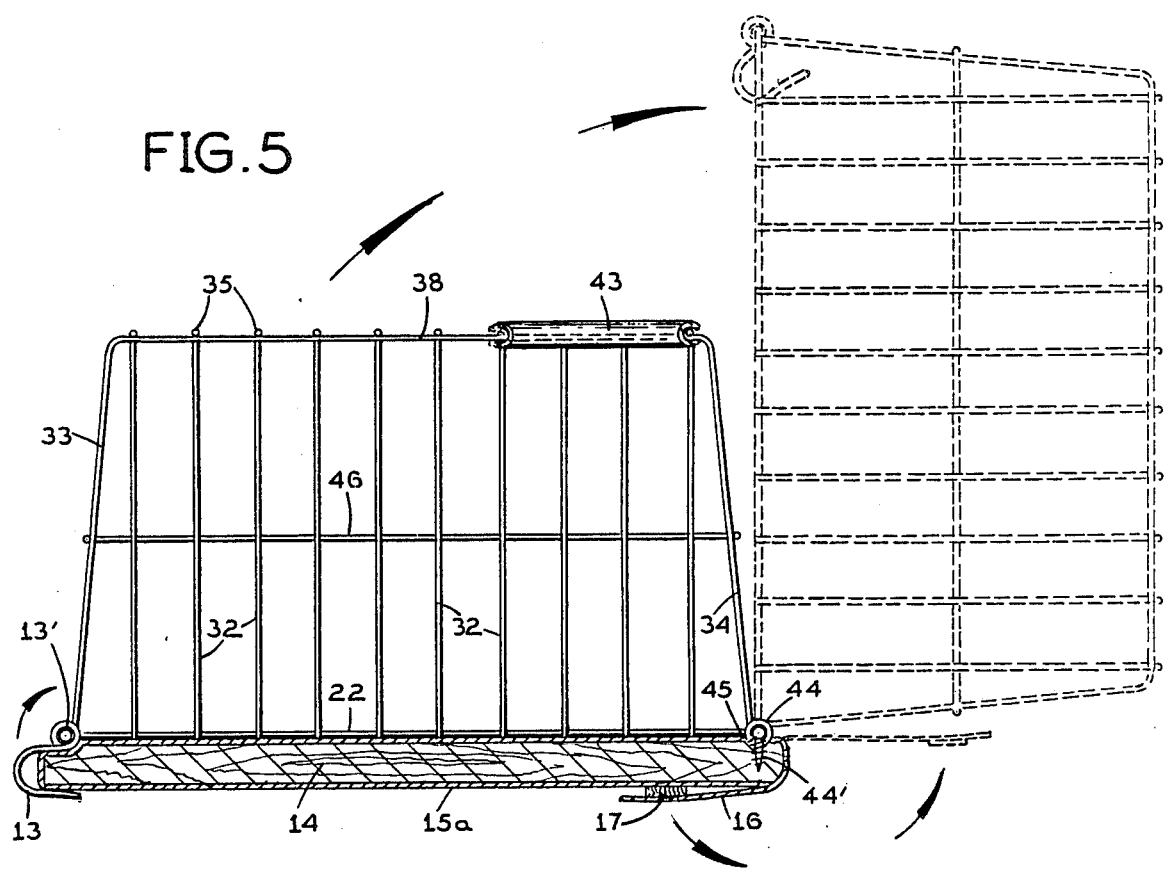
FIG. 5 is a longitudinal section taken along the line 5—5 in FIG. 2, and in phantom showing the animal carrier in an open position.

As shown in FIG. 5, each hook 44 has a screw-threaded stem 44' extending down from its arcuate upper end into the material of the base board 14. Normally, each stem is screwed down into the base board far enough that the arcuate upper end of the hook retains the end segment 24 of the bottom rail 20 of the inverted wire basket 11 on the base 10 and prevents any effort the animal might make to dislodge it from beneath the hooks. However, a person can turn the hooks in a direction to raise their arcuate upper ends far enough to permit sliding this end segment out from beneath these hooks. This would be done after releasing the hook-shaped wire 13 from the opposite end of the base. Thus, a person can deliberately detach the inverted wire basket 11 from the base, for example, as a preliminary to removing the fabric cover 15 from the base board 14 for cleaning.

At the opposite end of the basket the generally hook-shaped wire 13 is manually releasably engageable with the cloth-covered end of baseboard 14. The upper end 13' of wire 13 (FIG. 5) is reversely bent around the adjacent end segment 23 of the bottom rail of the inverted basket so that wire 13 can be pivoted about this segment between the locking position shown in FIGS. 1,2,3 and 5 and a raised position (in the direction of the adjacent arrow in FIG. 5) in which it releases that end of the inverted basket from the base so that the basket may be raised to the phantom line position in FIG. 5.

A wire segment 46 extends horizontally around the periphery of the basket about midway along the upstanding wire members 31,32,33 and 34 and is rigidly attached to all of them to provide a reinforcement.

Figure 6:
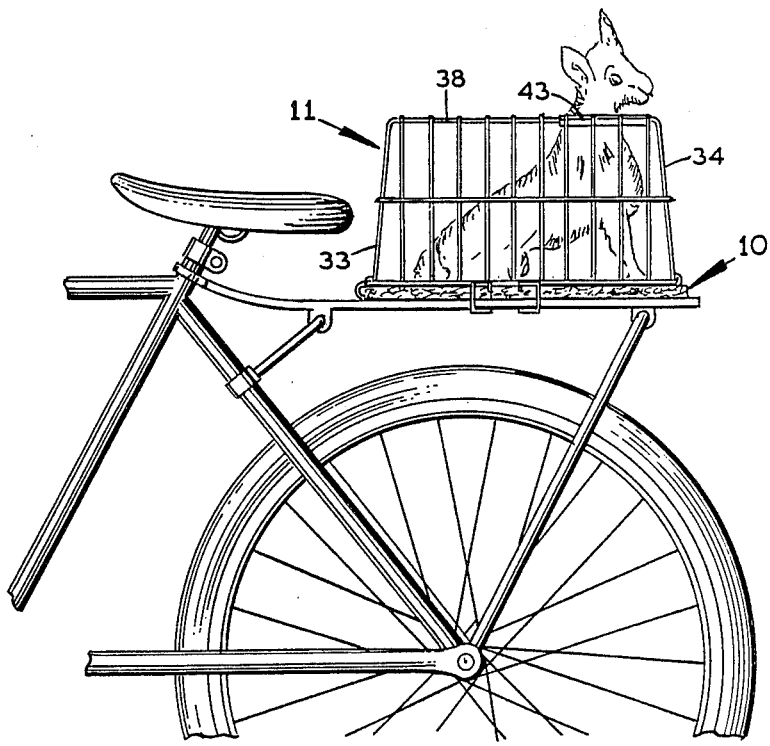
FIG. 6 shows the animal carrier on the back of a bicycle.

FIG. 6 shows how the animal carrier can be mounted on the back of a bicycle with the animal comfortably positioned. The opening 41 for the animal's head and neck is shown at the back end of the carrier so that the animal faces rearward. However, the position of the carrier could be reversed end-to-end so that the opening 41 would be at its front end and the animal inside would face forward.

The openings between neighboring wire members 31 and between neighboring wire members 32 on the opposite sides of the animal carrier are wide enough to pass a conventional passenger car seat belt so that the animal carrier is held safely on the seat of the car.

Also, the openings at the top of the animal carrier are wide enough to comfortably receive the fingers of a person's hand, so that the animal carrier with the animal inside can be conveniently carried by hand.

I claim:
1. A portable carrier for a small animal comprising:
a substantially rigid flat base;
an inverted wire basket presenting a peripheral bottom rail resting on said base, upstanding rigid wire members extending up from said bottom rail at intervals close enough to prevent the animal from escaping between said upstanding members, and rigid wire top members extending substantially horizontally between the upper ends of said upstanding members in a criss-cross pattern at the top of the inverted basket, said top members at one end of the inverted basket defining an opening large enough to pass the animal's head and neck but not the animal's body below the neck;
a flexible protective strip covering said top members along the edges of said opening over substantially its entire periphery;
hinge means hingedly attaching said bottom rail of the inverted basket to said base at one end of the basket;
and manually releasable means for attaching said bottom rail to the base base away from said hinge means.

2. A carrier according to claim 1 wherein said opening in the top of the inverted basket is at the same end of the basket as said hinge means.

3. A carrier according to claim 2 and further comprising a cover of soft absorbent material on said base.

4. A carrier according to claim 3 wherein said manually releasable means is a hook-shaped wire hingedly attached to said bottom rail at the opposite end of the inverted basket from said hinge means.

5. A portable carrier for a small animal comprising:
a substantially rigid flat base;
a cover of soft absorbent material on said base;
an inverted wire basket presenting a peripheral bottom rail resting on said base, upstanding rigid wire members extending up from said bottom rail at intervals close enough to prevent the animal from escaping between said upstanding members, and rigid wire top members extending substantially horizontally between the upper ends of said upstanding members in a criss-cross pattern at the top of the inverted basket, said top members at one end of the inverted basket defining an opening large enough to pass the animal's head and neck but not the animal's body below the neck;
hinge means hingedly attaching said bottom rail of the inverted basket to said base at one end of the basket;
said opening in the top of the inverted basket being at the same end of the basket as said hinge means;
and manually releasable means for attaching said bottom rail to the base away from said hinge means, said manually releasable means being a hook-shaped wire hingedly attached to said bottom rail at the opposite end of the inverted basket from said hinge means;
said hinge means comprising a plurality of hooks, each having a screw-threaded stem screwed into the base and a generally C-shaped upper end segment extending over the top and on opposite sides of said bottom rail of the inverted basket to hold said bottom rail on the base, each of said hooks being rotatable in one direction to raise its C-shaped upper end segment far enough above the base to permit said bottom rail to be slid from beneath said C-shaped segment.

6. A portable carrier for a small animal comprising:
a substantially rigid flat base;

an inverted wire basket presenting a peripheral bottom rail resting on said base, upstanding rigid wire members extending up from said bottom rail at intervals close enough to prevent the animal from escaping between said upstanding members, and rigid wire top members extending substantially horizontally between the upper ends of said upstanding members in a criss-cross pattern at the top of the inverted basket, said top members at one end of the inverted basket defining an opening large enough to pass the animal's head and neck but not the animal's body below the neck;

hinge means hingedly attaching said bottom rail of the inverted basket to said base at one end of the basket;

and manually releasable means for attaching said bottom rail to the base away from said hinge means;

said hinge means comprising a plurality of hooks, each having a screw-threaded stem screwed into the base and a generally C-shaped upper end segment extending over the top and on opposite sides of said bottom rail of the inverted basket to hold said bottom rail on the base, each of said hooks being rotatable in one direction to raise its C-shaped upper end segment far enough above the base to permit said bottom rail to be slid from beneath said C-shaped segment.

7. A portable carrier for a small animal comprising:
a substantially rigid flat base;
an inverted basket presenting a peripheral bottom rail resting on said base and a top spaced above said bottom rail;
hinge means hingedly attaching said bottom rail of the inverted basket at one end thereof to said base;
said top of the inverted basket having an opening at said one end thereof large enough to pass the animal's head and neck but not the animal's body below the neck;
and manually releasable means for attaching said bottom rail to the base at the opposite end of said bottom rail from said hinge means.

8. A portable carrier for a small animal comprising:
a substantially rigid flat base;
an inverted basket presenting a peripheral bottom rail resting on said base and a top spaced above said bottom rail;
hinge means hingedly attaching said bottom rail of the inverted basket at one end thereof to said base;
said top of the inverted basket having an opening large enough to pass the animal's head and neck but not the animal's body below the neck;
and manually releasable means for attaching said bottom rail to the base away from said hinge means;
said hinge means comprising a plurality of hooks, each having a screw-threaded stem screwed into the base and a generally C-shaped upper end segment extending over the top and on opposite sides of said bottom rail of the inverted basket to hold said bottom rail on the base, each of said hooks being rotatable in one direction to raise its C-shaped upper end segment far enough above the base to permit said bottom rail to be slid from beneath said C-shaped segment.

* * * * *